(12) United States Patent
Mudric et al.

(10) Patent No.: US 10,182,006 B2
(45) Date of Patent: Jan. 15, 2019

(54) INTERNET PROTOCOL ADDRESS SELECTION IN SESSION INITIATION PROTOCOL COMMUNICATIONS

(71) Applicant: Avaya Inc., Basking Ridge, NJ (US)

(72) Inventors: Dusan Mudric, Ottawa (CA); Peter Musgrave, Dunrobin (CA)

(73) Assignee: Avaya Inc., Basking Ridge, NJ (US)

( * ) Notice: Subject to any disclaimer, the term of this patent is extended or adjusted under 35 U.S.C. 154(b) by 262 days.

(21) Appl. No.: 15/296,518

(22) Filed: Oct. 18, 2016

(65) Prior Publication Data

US 2018/0109447 A1    Apr. 19, 2018

(51) Int. Cl.
*H04L 29/08* (2006.01)
*H04L 12/721* (2013.01)
*H04L 29/06* (2006.01)
*H04L 29/12* (2006.01)

(52) U.S. Cl.
CPC .......... *H04L 45/34* (2013.01); *H04L 61/6059* (2013.01); *H04L 61/6086* (2013.01); *H04L 65/1006* (2013.01); *H04L 65/1069* (2013.01); *H04L 65/1073* (2013.01); *H04L 67/148* (2013.01)

(58) Field of Classification Search
CPC . H04L 45/34; H04L 65/1006; H04L 65/1069; H04L 65/1073; H04L 61/6086; H04L 61/6059; H04L 67/148
USPC ........................................ 709/227, 228, 229
See application file for complete search history.

(56) References Cited

U.S. PATENT DOCUMENTS

| | | | | |
|---|---|---|---|---|
| 5,636,216 A * | 6/1997 | Fox | .......................... | H04L 12/66 370/402 |
| 5,884,038 A * | 3/1999 | Kapoor | ............. | H04L 29/12009 709/226 |
| 6,304,913 B1 * | 10/2001 | Rune | ................. | H04L 29/12066 709/241 |
| 6,567,405 B1 * | 5/2003 | Borella | ............. | H04L 29/12009 370/389 |
| 6,678,732 B1 * | 1/2004 | Mouko | ............... | H04L 61/2015 709/203 |
| 6,718,387 B1 * | 4/2004 | Gupta | ..................... | H04L 29/06 370/397 |
| 6,965,584 B2 * | 11/2005 | Agrawal | ........... | H04L 29/12311 370/331 |
| 2004/0052216 A1 * | 3/2004 | Roh | ..................... | H04L 12/2856 370/252 |

(Continued)

*Primary Examiner* — Frantz Coby

(57) ABSTRACT

Examples disclosed herein provide methods and systems for selecting Internet Protocol addresses for Session Initiation Protocol (SIP) communications. In at least one implementation, a method of operating a first communication device includes applying a source address selection algorithm to determine at least one source Internet Protocol (IP) address for the first communication device, and transferring a communication invite that indicates the at least one source IP address. The method further provides, receiving, from a second communication device, a response to the invite that indicates at least one IP address for the second communication device, applying SASA to the at least one IP address to determine a third source IP address for the first communication device, and initiating a communication with the second communication device using the third source IP address.

20 Claims, 7 Drawing Sheets

(56) References Cited

U.S. PATENT DOCUMENTS

2008/0182573 A1* 7/2008 Lauer ................. H04B 7/18506
　　　　　　　　　　　　　　　　　　　　　　455/431
2012/0011274 A1* 1/2012 Moreman ............. H04L 12/287
　　　　　　　　　　　　　　　　　　　　　　709/238

* cited by examiner

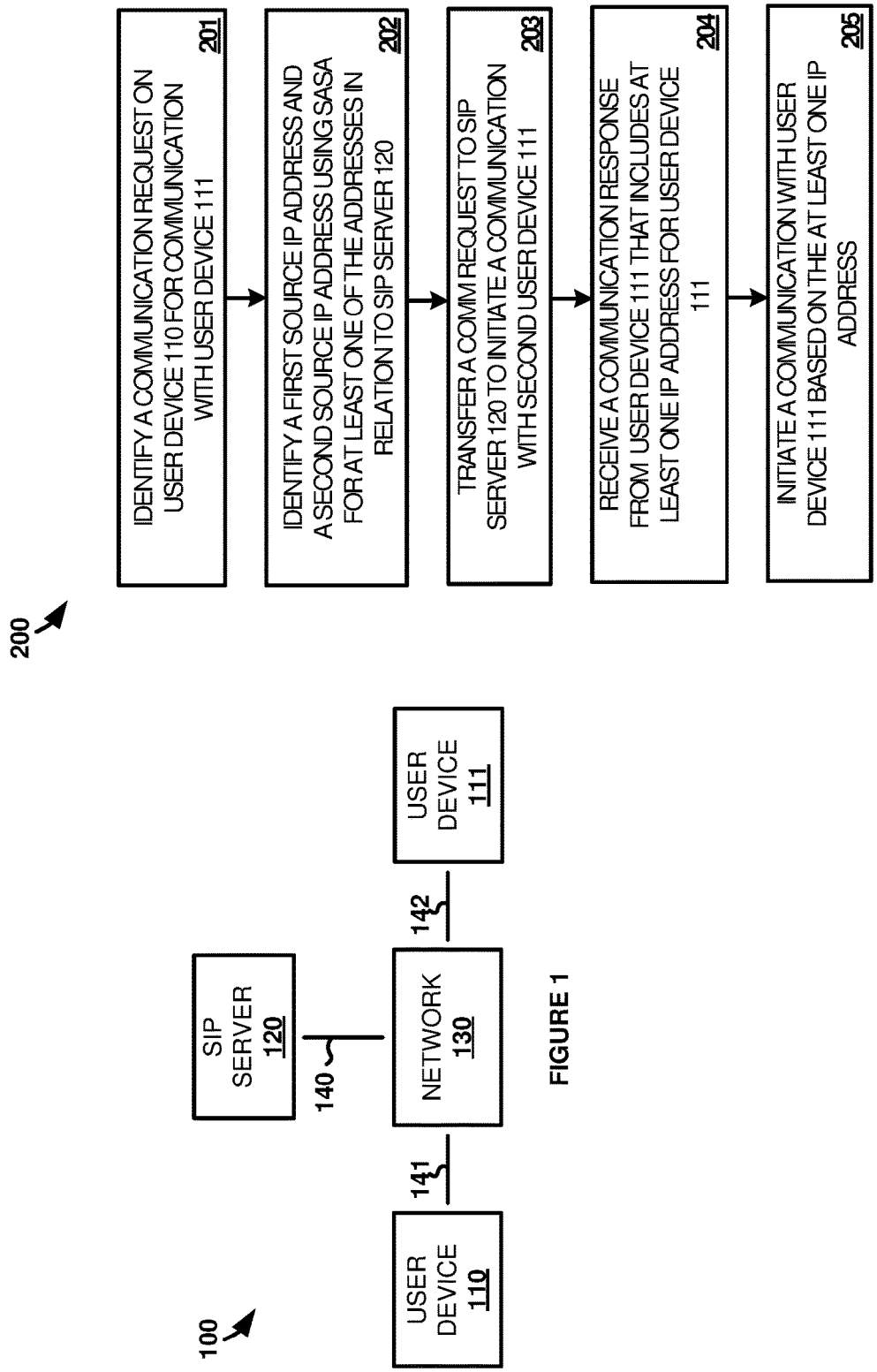

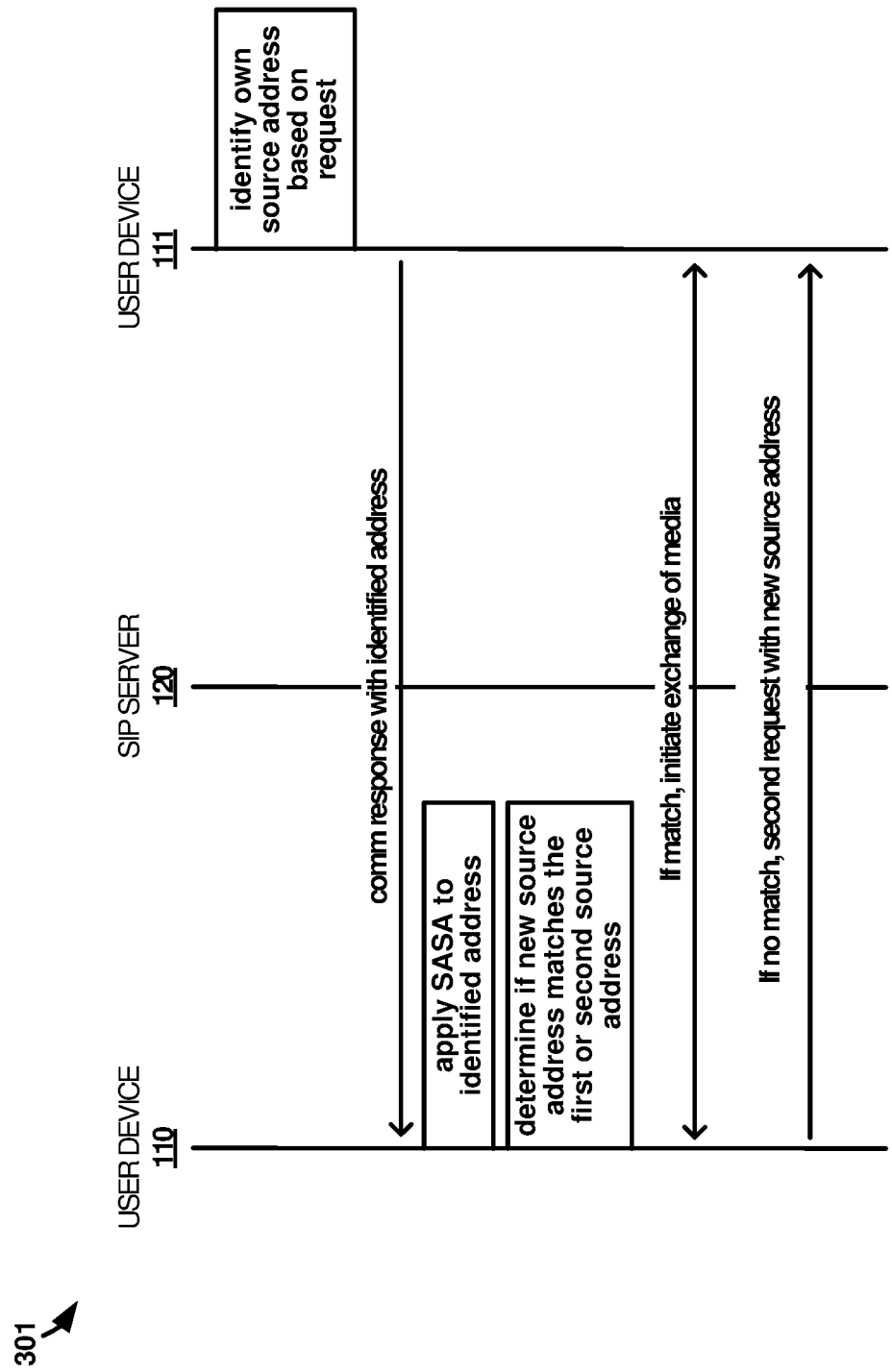

INTERNET PROTOCOL ADDRESS SELECTION IN SESSION INITIATION PROTOCOL COMMUNICATIONS

TECHNICAL BACKGROUND

Session Initiation Protocol (SIP) is a communications protocol for signaling and controlling multimedia communication sessions. These communication sessions may include internet telephony for voice calls and video calls, as well as instant messaging over internet protocol (IP) networks. To provide the communications, SIP works in conjunction with other application layer protocols that identify and carry the session media. In particular, media identification and negotiation is achieved using Session Description Protocol (SDP), which is used for session announcement, session invitation, and parameter negotiation.

In some implementations, SDP may be used to provide IP address information between a requesting system and a receiving system. This IP address information permits the receiving system to identify the source of a communication request. However, although the requesting system may provide the receiving system with IP address information, the IP address information may not provide a preferred path to the requesting system. In particular, if the requesting system is allocated multiple IP addresses, current communication invite methods are incapable of determining a preferred path to one of the addresses allocated to the requesting system. Additionally, with current methods, it may be difficult to setup and configure communications due to firewalls, routers, and other mechanisms of a network that block communications between particular IP addresses.

Overview

Examples disclosed herein provide systems, methods, and computer readable media to enhance address selection in session initiation protocol (SIP) communications. In one implementation, a method of operating an end user communication device that is assigned a plurality of internet protocol (IP) addresses includes, in response to a request to communicate with a second communication device, identifying a first source IP address and a second source IP address from the plurality of IP addresses, wherein at least one of the first source IP address or the second source IP address is selected using a source address selection algorithm (SASA) with a destination IP address for a Session Initiation Protocol (SIP) server. The method further provides, transferring a communication request to the SIP server with the first source IP address and the second source IP address to invite a communication with the second communication device, and receiving a communication response from the second communication device that indicates at least one IP address for the second communication device. The method also includes, applying SASA to the at least one IP address for the second communication device to determine a third source IP address for the end user communication device, and initiating the communication with the second communication device using the third source IP address.

In one implementation, a computing apparatus includes one or more non-transitory computer readable storage media and a processing system operatively coupled with the one or more non-transitory computer readable storage media. The computing apparatus further includes program instructions stored on the one or more non-transitory computer readable media to operate an end user communication device assigned a plurality of IP addresses that, when executed by the processing system, direct the processing system to, in response to a request to communicate with a second communication device, identify a first source IP address and a second source IP address from the plurality of IP addresses, wherein at least one of the first source IP address or the second source IP address is selected using a SASA with a destination IP address for a SIP server. The program instructions further direct the processing system to transfer a communication request to the SIP server with the first source IP address and the second source IP address to invite a communication with the second communication device, and receive a communication response from the second communication device that indicates at least one IP address for the second communication device. The program instructions also direct the processing system to apply SASA to the at least one IP address for the second communication device to determine a third source IP address for the end user communication device, and initiate the communication with the second communication device using the third source IP address.

In another implementation, a communication system includes a first communication device allocated a plurality of internet protocol (IP) addresses and configured to, in response to a request to communicate with a second communication device, identify a first source IP address and a second source IP address from the plurality of IP addresses, wherein at least one of the first source IP address or the second source IP address is selected using a source address selection algorithm (SASA) with a destination IP address for a Session Initiation Protocol (SIP) server, and transfer a communication request to the SIP server with the first source IP address and the second source IP address to invite a communication with the second communication device. The communication system further includes the second communication device configured to identify at least one IP address for the second communication device and transfer a communication response to the first communication device that indicates the at least one IP address. The communication system also provides the first communication device configured to receive the communication response, apply SASA to the at least one IP address for the second communication device to determine a third source IP address for the first communication device, and initiate the communication with the second communication device using the third source IP address.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a communication system to identify source internet protocol addresses for a session initiation protocol (SIP) communication according to one implementation.

FIG. 2 illustrates a method of operating a requesting communication device to invite a receiving communication device for a SIP communication according to one implementation.

FIGS. 3A-3C illustrate a timing diagrams to invite a receiving communication device to a SIP communication according to various implementations.

DETAILED DESCRIPTION

Figure 3A:
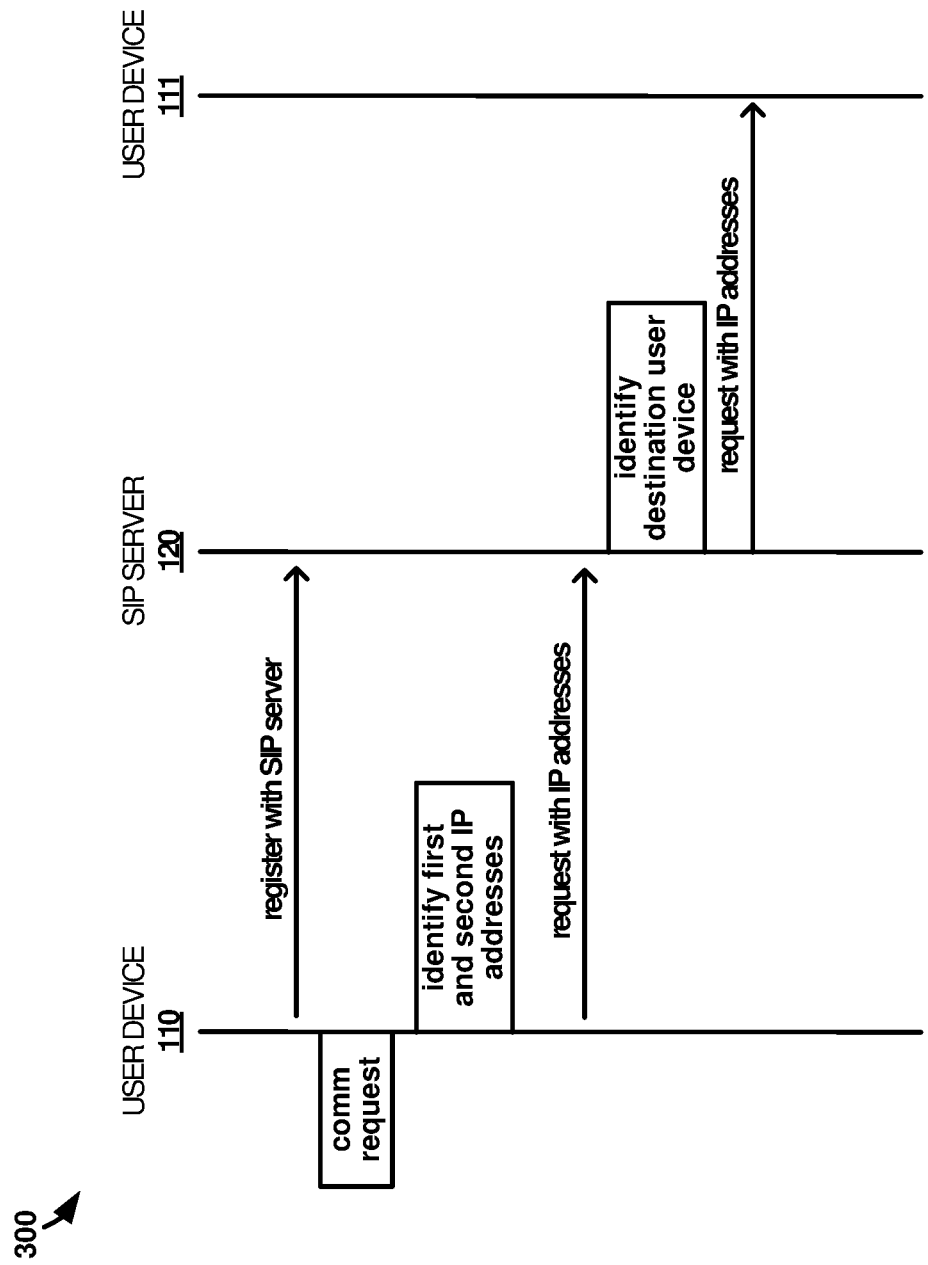

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates a communication system 100 to identify source internet protocol (IP) addresses for a session initiation protocol (SIP) communication according to one implementation. Communication system 100 includes end user devices 110-111, Session Initiation Protocol (SIP) server 120, and network 130. User device 110 communicates with network 130 via communication link 141, user device 111 communicates with network 130 via communication link 142, and SIP server 120 communicates with network 130 via communication link 140. Although illustrated as a single link between each of user devices 110-111 and network 130 it should be understood that multiple communication links may exist between the user devices and network 130. For example, user device 110 may connect to network 130 using multiple internet protocol (IP) addresses.

In operation, user devices 110-111 connect to network 130 and SIP server 120 to provide desired communications for users of user devices 110-111. These communications may include internet telephony for voice calls and video calls, as well as instant messaging over internet protocol (IP) networks. To provide the communications, SIP server 120 is provided to setup and configure the communications between end users over network 130. In particular, the SIP server may be contacted by an end user device of user devices 110-111 when a communication is required, and the SIP server may forward the request to the appropriate destination device.

In the present implementation, each end user device of user devices 110-111 comprise multihomed devices, which permits communications over various communication routes of network 130. For example, if end user device 110 included two interfaces, each connected to a different router, communications from other devices may be routed over each of the routers. As a result of this configuration, some communications may be routed over a non-ideal path, or may be blocked based on firewall and other security measures at each of the routers.

Here, to enhance the operation of the multihomed or interface devices, a source address selection algorithm (SASA), defined by the Internet Engineering Task Force (IETF), is applied when a communication is initiated by one of the multihomed devices. This SASA algorithm may be defined by RFC 6724 of the IETF, or any other iteration of the RFC that describes a source address selection algorithm.

For example, when user device 110 requests a communication that is routed to SIP server 120, user device 110 may apply SASA to identify at least one source address for the proper communication path to SIP server 120. Using the example of user device 110 being connected to two routers, wherein each router communicates using a different IP address or addresses with user device 110, user device 110 may select at least one source IP address based on SASA for the desired path to SIP server 120. Once the communication is transferred to SIP server 120, SIP server 120 forwards the communication request with any identified source addresses to an IP address for user device 111. User device 111 then transfers a response to user device 110, which may be transferred over the SIP server, indicating at least one preferred IP address allocated for user device 111, and user device 110 initiates the communication or transfers a second communication request based on the response by user device 111.

To further demonstrate the operations of communication system 100, FIG. 2 is provided. FIG. 2 illustrates a method 200 of operating a requesting communication device to invite a receiving communication device for a SIP communication according to one implementation. The operations of FIG. 2 are referenced parenthetically in the paragraphs that follow, along with references to the elements and systems from communication system 100 of FIG. 1.

User device 110 opens a registration socket to communicate with SIP server 120. User device 110 uses signaling socket to negotiate the appropriate session description protocol SDP signal to communicate with user device 111. In some examples, the sockets used for the registration communications may be different than the sockets that are used for the media communication with user device 111. In operation, user device 110 identifies a communication request for a communication with user device 111 (201). This request may be generated based on user input of a user on user device 110, may be generated based on an automated process, or may be generated in any other similar manner. In response to the request, user device 110 identifies a first source IP address and a second source IP address, wherein at least one of the first source IP address or the second source IP address is selected using SASA with a destination source IP address with SIP server 120 (202).

For step 202 the SDP negotiation in ANAT protocol (RFC 4091 and RFC 4092), user device 110 has to provide its IP v4 and IP v6 source IP addresses as part of the negotiation for the media socket. In the initial SDP negotiation, the two IP addresses are selected either using SASA to the IPv4 and IPv6 addresses of SIP server 120 or, if only one SIP server IP address is available, one address is obtained using SASA to SIP server 120. To determine the second address, user device 110 may again use SASA if the second IP address of the server is known, such as when both the IPv4 and the IPv6 address of the SIP server are known 120, or, in the alternative, may apply various selection processes to determine the second source address. For example, user device 110 may be allocated multiple IP addresses that are capable of providing user device 110 with different communication routes to desired destination devices. In particular, user device 110 may be capable of communicating with SIP server 120 using different routes based on IP addresses that are allocated to the device. By using SASA and a known address for SIP server 120, user device 110 may be able to determine a preferred source address with the destination user device 111.

In some implementations, the process of identifying the first source IP address and the second source IP address comprises the following operations. To determine a first source IP address for the communication, user device 110 will use SASA with a known IP address for the SIP server to select an IP address allocated to user device 110 that should be used for a media line in the communication request. For example, if user device 110 maintains an address for the SIP server (such as an IPv4 address for the server), user device 110 may be able to test each IP address allocated to user device 110 to determine which of the allocated IP addresses should be selected to communicate with the server IP address. In addition to selecting the first address using SASA, user device 110 will then select a second source address, as alternative network address type (ANAT) semantics require both an IPv4 and an IPv6 source address to be included in a communication request. To determine the second address, user device 110 may again use SASA if the second IP address of the server is known, such as when both the IPv4 and the IPv6 address of the SIP server are known, or, in the alternative, may apply various selection processes to determine the second source address.

These selection processes may be performed in the following manner. First, user device 110 will seek to select an IP address from the same interface where the first media address was determined. For example, if the first media line has an IPv4 address the second media line would be assigned an IPv6 address from the same interface. Second, user device 110 will attempt to determine precedence for available addresses, wherein, for IPv6 addresses, the device will prefer addresses with a larger scope (addresses with global scope over a unique local address), and wherein for IPv4 addresses the device will prefer public over private addresses. In some implementations, if there are multiple addresses of the same scope, the device will then revert to manual configuration, Dynamic Host Configuration Protocol (DHCP) configuration, or stateless configuration to determine the second source address for the communication request.

In some examples, the first source IP address and the second source IP address in the media line are formatted such that a preferred source IP address is placed in the first media line, and a secondary source IP address is placed in the second media line. Consequently, if IPv6 is preferred for user device 110 over IPv4, then the IPv6 address determined using the operations described above will be placed in the first media line. In contrast if a IPv4 is preferred for user device 110 over IPv6, then the IPv4 address determined using the operations described above will be placed in the first media line. User device 111 may then use the preferred IP address for user device 110 in selecting its own source IP address in some examples.

Once the addresses are determined for the communication request using the aforementioned operations, user device 110 transfers a communication request to SIP server 120 to initiate a communication with user device 111, wherein the request includes the first source address and the second source address (203). In some implementations, this request may be transferred using Session Description Protocol (SDP). Once the request is transferred, user device 110 then receives a communication response, which may comprise a 200 OK message, from user device 111 that indicates at least one IP address for user device 111 (204). User device 110 then initiates a communication with user device 111 based on the at least one IP address included in the response (205).

In some implementations, the at least one IP address for user device 111 comprises a single IP address for user device 111. When a single address is indicated for user device 111, user device 110 performs a second SASA operation using the single address as the destination for the communication to determine a third source IP address. If the third source IP address matches a source address that was provided in the initial communication request, then user device 110 initiates the exchange of media communications with user device 111 using the third source IP address determined using SASA and the single IP address provided for user device 111. If, however, the third source IP address fails to match a source address that was provided in the initial communication request, user device 110 may transfer a second communication request to invite user device 111, wherein the second communication request is directed at the single IP address for user device 111 and includes the third source IP address for user device 110.

In other implementations, rather than providing a single IP address for user device 110, user device 111 may provide a response with multiple available IP addresses allocated to user device 111. For example, user device 111 may be allocated four IP address when user device comprises a multihomed device. These four addresses may then be provided by user device 111 to user device 110 in the communication response. Once received by user device 110, user device 110 may perform a destination address selection algorithm (DASA) to determine a destination IP address for user device 111, wherein DASA is defined by the IETF in at least RFC 6724, or any other later iteration of the RFC that describes a destination address selection algorithm. Further, once the destination address is determined for user device 111, user device 110 may perform SASA operations on the destination address to determine the preferred source IP address for user device 110. After the preferred source/destination addresses are determined, user device 110 transfers a second communication request, or SIP INVITE, to the destination address for user device 111, wherein the request includes the preferred source IP address for user device 110. This request may then be responded to by user device 111 establishing the communication between the two devices.

Although described in the example of FIG. 2 as using SASA in generating the media lines for a SIP communication request with a second user device, it should be understood that SASA may be used in other implementations by user device 110 and user device 111. In particular, to properly register with SIP server 120, user device 110 may perform SASA with a known IP address for SIP server 120 to determine an appropriate source IP address for user device 110 in relation to SIP server 120. Once SASA is performed, user device 110 may register with SIP server 120 using the address determined in the SASA operation. This helps ensure that SIP server 120 will be capable of communicating with user device 110. User device 111 may also perform similar operations to register with SIP server 120.

Further, in addition to providing source addresses in the media line of a SIP communication request, as described herein, user device 110 may also use SASA in determining the Via header for the communication request. Using the example of FIG. 1, the request needs to ensure that a 200 OK message could be received from user device 111. To provide this functionality, user device 110 may use SASA to identify a source IP address for user device 110 in relation to SIP server 120, wherein the identified source IP address will be placed in the Via header to ensure that a 200 OK message from user device 111 will be delivered to user device 110. In particular, performing the SASA operation selects a router path for the return message from user device 111 to help prevent the 200 OK message from being blocked at an improper router for user device 110.

Although described in the previous example as using SASA to determine the address to be used in the Via header, it should be understood that the SASA operations may be used to determine any source address for the SIP headers. For example, SASA may be used in determining the Record Route address that can be provided in the initial communication request from user device 110. By using SASA to determine source addresses for the SIP headers, user device 110 may ensure that subsequent communication requests, such as re-invites, can reach user device 111 to renegotiate media attributes.

Figure 3C:
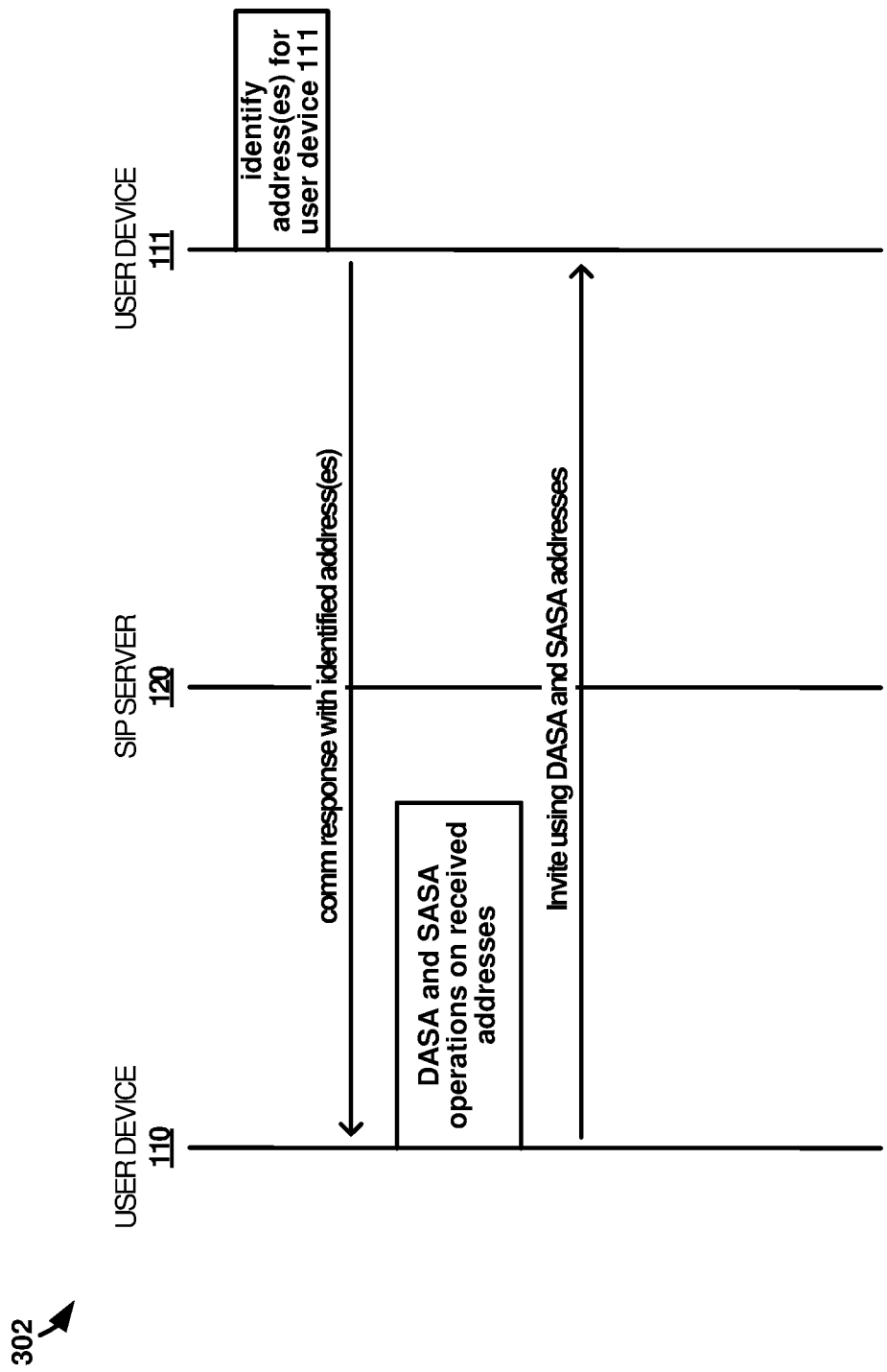

FIGS. 3A-3C illustrate a timing diagrams 300-302 to invite a receiving communication device to a SIP communication. FIGS. 3A-3C include user device 110 SIP server 120, and user device 111. Network 130 has been omitted for simplicity.

As depicted in FIG. 3A and timing diagram 300, user device 110 initially registers with SIP server 120. To accommodate the registration, user device 110 may perform SASA with a known address for the SIP server to determine a registration IP address (socket) for user device 110. Once identified, user device may use the registration IP address to register user device 110 with SIP server 120.

After registration, user device 110 identifies a communication request, wherein the request may comprise a request for a voice communication, a video communication, a text based communication, or any other similar communication between two or more devices. In response to the communication request, user device identifies first and second source IP addresses for the communication. In particular, user device 110 identifies at least one of the first source IP address or the second source IP address using SASA in conjunction with an IP address for SIP server 120. For example, a first IP address for user device 110 may provide a more desirable or shorter route to SIP server 120 than a second IP address for user device 110.

In some implementations, user device 110 may be required to identify both an IPv4 address and an IPv6 address as part of a media communication invite. To provide the addresses, user device 110 will first identify an IP address that is known for SIP server 120. Once identified, user device 110 will apply SASA using available source addresses used to user device 110 and the known address for the SIP server. Once SASA is applied, user device 110 will select the first source IP address based on the SASA operation, which can be either an IPv6 address or an IPv4 address. After determining the first address, user device 110 then identifies the second source IP address, wherein the second source IP address comprises an IPv4 address when the first address is an IPv6 address or IPv6 address when the first address comprises and IPv4 address.

To determine the second address, user device 110 will first determine if a second IP address for SIP server 110 is known. If a second address is known for the SIP server, then user device 110 will use the second address for determining the second source address using SASA. For example, if the IPv6 address for the SIP server was used in determining the first source address, then user device 110 may use an IPv4 address that is also known for the SIP server to determine the second source IP address.

In contrast, if a second address is not known for SIP server 120, user device 110 will select IP addresses from the same interface as the first address. For example, if user device 110 identified a first IPv4 address, then user device 110 would identify IPv6 addresses of the same interface as the first IPv4 address. Once the addresses are selected, user device 110 then sets precedence for IPv6 addresses based on which addresses have a larger scope, and sets precedence for IPv4 addresses based on which addresses are public over private. If multiple addresses are the same scope, then user device 110 will apply a manual configuration, a DHCP configuration, or a stateless configuration to determine the second address.

Once the addresses are identified for the communication invite, the communication request is transferred to SIP server 120, in some implementations using SDP. SIP server 120 then determines a destination IP address for user device 111, and forwards the request to user device 111 to invite user device 111 to communicate with user device 110.

Referring now to FIG. 3B and timing diagram 301, FIG. 3B demonstrates a reply and initiation of communication according to one implementation. Timing diagram 301 continues the operations that were described in timing diagram 300 of FIG. 3A.

As depicted, once a communication request is received by user device 111 to initiate a communication with user device 110, user device 111 identifies an IP address for itself and transfers a communication response that indicates the identified address. In some implementations, to determine the IP address for user device 111, user device 111 may apply SASA to a preferred source IP address provided by user device 110 to determine its own source IP address. For example, user device 111 may prefer IPv6 over IPv4, and may select the IPv6 address provided for user device 110 for the SASA operation. Once the source IP address is determined for user device 111, user device 111 may respond to the communication request, wherein the response will indicate the source address for user device 111. As an illustrative example, user device 111 may prefer IPv6 over IPv4 for communications with user device 110. Consequently, user device 111 will select the IPv6 address user device 110 provided in the initial communication request, and perform SASA operations using the IPv6 address to determine the source address for user device 111.

Once the response is received by user device 110, user device 110 identifies the destination address for user device 111 that was provided by user device 111. User device 110 may again apply SASA to the IP address associated with user device 111 to determine a preferred source IP address for user device 110. If the preferred source IP address for user device 110 matches the first source IP address or the second source IP address that was provided in the initial request, then the address selection is complete and the media communication between user device 110 and user device 111 may be initiated using the preferred source IP address and the destination IP address provided by user device 111. In contrast, if the preferred source IP address does not match the first source IP address or the second source IP address, user device 110 will transfer a second communication request or invite to user device 111 using the identified IP address for user device 111, wherein the communication request will also indicate the preferred source IP address for user device 110. This second invite will then be used to initiate the communication between user device 110 and user device 111.

In some implementations, the sockets used for the registration and signaling communications may be different than the sockets that are used for the media communication with user device 111. For example, a first source IP address (associated with a first socket) may be used for the request, registration and signaling with the SIP server. While a second source IP address (associated with a second socket) is used for the media signaling with user device 111. As a result, one socket may be used for the SIP registration and signaling portion of a communication, while a second socket may be used for the media (audio/video) communication. The source IP address of the first socket may be determined using SASA in conjunction with the IP address of the SIP server. The source IP address of the second socket may be determined using SASA in conjunction with: 1) the IP address of the SIP server, and, if needed, 2) the IP address or IP addresses provided from the second user device 111.

Turning now to FIG. 3C and timing diagram 302, FIG. 3C demonstrates a reply and initiation of communication according to one implementation. Timing diagram 302 continues the operations that were described in timing diagram 300 of FIG. 3A.

As depicted, when a communication request is received by user device 111, user device 111 identifies available addresses for communicating with user device 111. For example, if user device 111 were allocated four IP addresses for communication with other devices, user device 111 may identify the four IP addresses for the communication. Once the addresses are identified user device 111 transfers a communication response, or a 200 OK message, to user device 110 with the identified addresses. User device 110 receives the communication response and performs operations to determine the appropriate addressing between user device 110 and user device 111 to initiate the communication.

In a particular example, user device 110 first performs DASA to select an IP address for user device 111. Once a destination address is determined using DASA, user device 110 then applies SASA to determine a source IP address that should be used in accordance with the selected destination address. After determining the destination address from the addresses provided for user device 111, and the source address from the available addresses allocated to user device 110, user device 110 may transfer a second communication request to user device 111, wherein the second communication request initiates a communication using the determined source address for user device 110.

Figure 4:
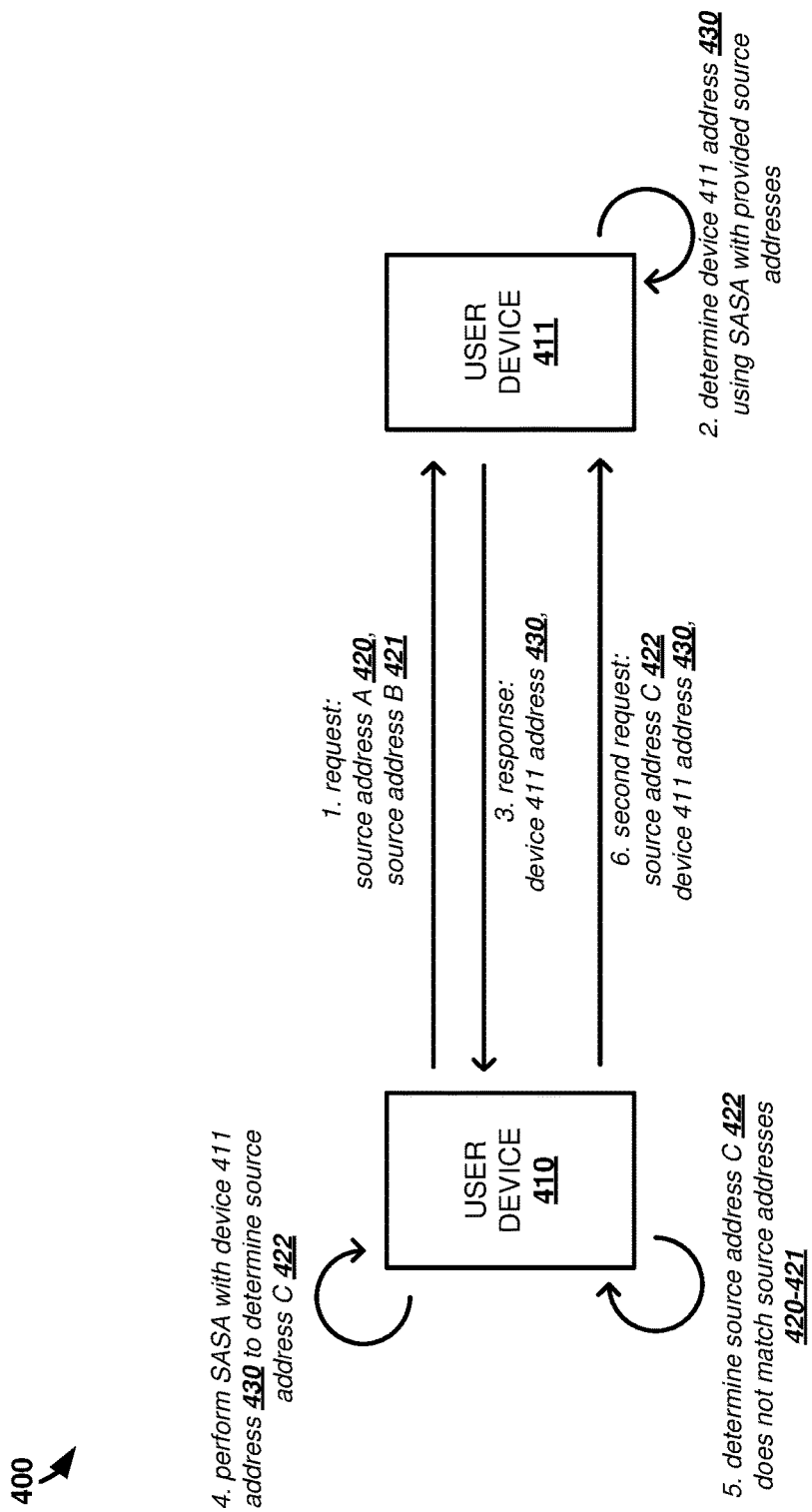
FIG. 4 illustrates an operational scenario of initiating a SIP communication between two user devices according to one implementation.

FIG. 4 illustrates an operational scenario 400 of initiating a SIP communication between two user devices according to one implementation. Operational scenario 400 includes user device 410 and 411. User devices 410-411 may include any user communication device capable of SIP communications. Although not illustrated in the example of operational scenario 400, it should be understood that a SIP server is used to set up and assist in the configuration of the communication, is used in the selection of at least one source address for user device 410, and is used to forward a communication request to second user device 411.

As depicted in operational scenario 400, at step 1, user device 410 identifies source addresses A and B 420-421 using SASA and transfers the source addresses, as a communication request over a SIP server, to user device 411. In response to receiving the request, user device 411 applies SASA to source addresses 420-421 to determine device 411 address 430, at step 2. Once address 430 is identified for user device 411, a response is delivered, at step 3, to user device 410 that includes address 430. Upon receipt of the response with address 430, user device 410 performs, at step 4, SASA operations using address 430 to determine source address C 422 for user device 410. Source address 422 may then be compared by user device 410, at step 5, to source addresses A and B 420-421. Here, source address 422 is determined to be different than source addresses A and B 420-421. Consequently, at step 6, user device 410 transfers a second request to user device 411 using address 430, and including source address 422 for the communication.

Although illustrated in operational scenario 400 with source address C 422 failing to match the source addresses from the initial request, it should be understood that the source address determined during step 4 may match the original source addresses provided by user device 410 in the request at step 1. In such instances, user device 410 may not be required to transfer a second invitation and may instead implement the communication using the source IP address provided in the first request and the destination IP address received in the 200 OK response.

Figure 5:
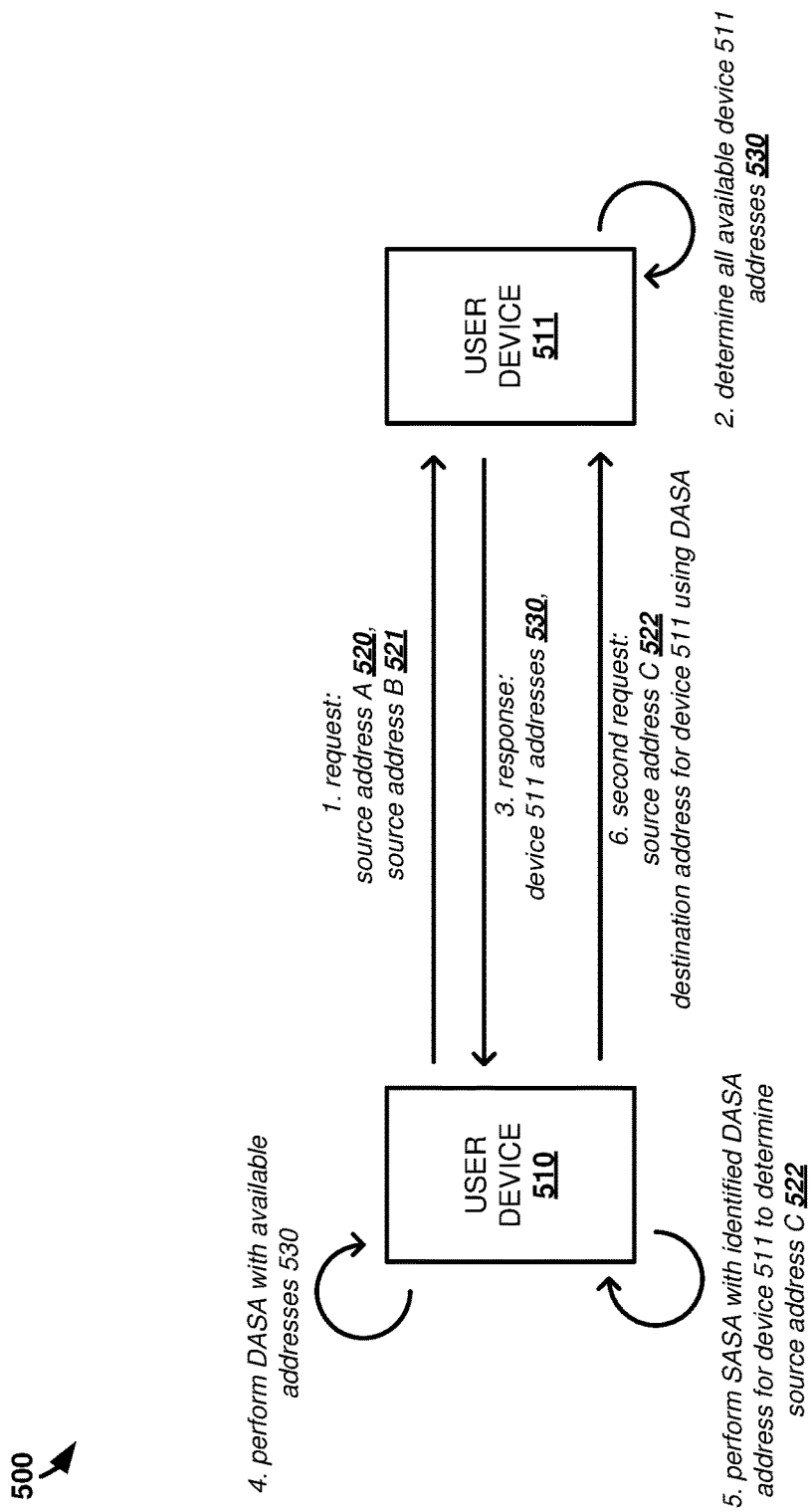
FIG. 5 illustrates an operational scenario of initiating a SIP communication between two user devices according to one implementation

FIG. 5 illustrates an operational scenario 500 of initiating a SIP communication between two user devices according to one implementation. Operational scenario 500 includes user device 510 and 511. User devices 510-511 may include any user communication device capable of SIP communications. Although not illustrated in the example of operational scenario 500, it should be understood that a SIP server is used to set up and assist in the configurations, and is used to identify the IP address for second user device 511 to deliver the initial communication request.

As depicted in operational scenario 500, at step 1, user device 510 identifies source addresses A and B 520-521 using SASA with the SIP server and transfers the source addresses, as a communication request over the SIP server, to user device 511. In response to receiving the request, user device 511 determines, at step 2, all available addresses 530 for user device 511. For example, user device may include multiple interfaces with multiple available IP addresses. Consequently, to ensure that user device 510 uses the appropriate IP address for communication with user device 511, user device 511 identifies all available IP addresses for the SIP communication. Once the addresses are identified, user device 511 transfers, at step 3, a communication response, wherein the communication response includes user device 511 available addresses 530. In some implementations, this response is delivered as a 200 OK message to user device 510 using one of source address A 520 or source address B 521.

After receiving the communication response from user device 511, user device 510 performs, at step 4, DASA operations on available addresses 530 to determine the appropriate destination address for user device 511. This DASA defined address is then used by user device 510 to determine source address C 522 by performing, at step 5, SASA operations with the DASA defined address. Once the destination address and the source address are determined by user device 510, user device 510 may then transfer, at step 6, a second request to user device 511, wherein the second request indicates source address C 522 for user device 510. In some implementations, source address C 522 may be equivalent to one of source address A 520 or source address B 521. However, it should be understood that source address C 522 may comprise an address that is different than source addresses A and B 520-521.

Figure 6:
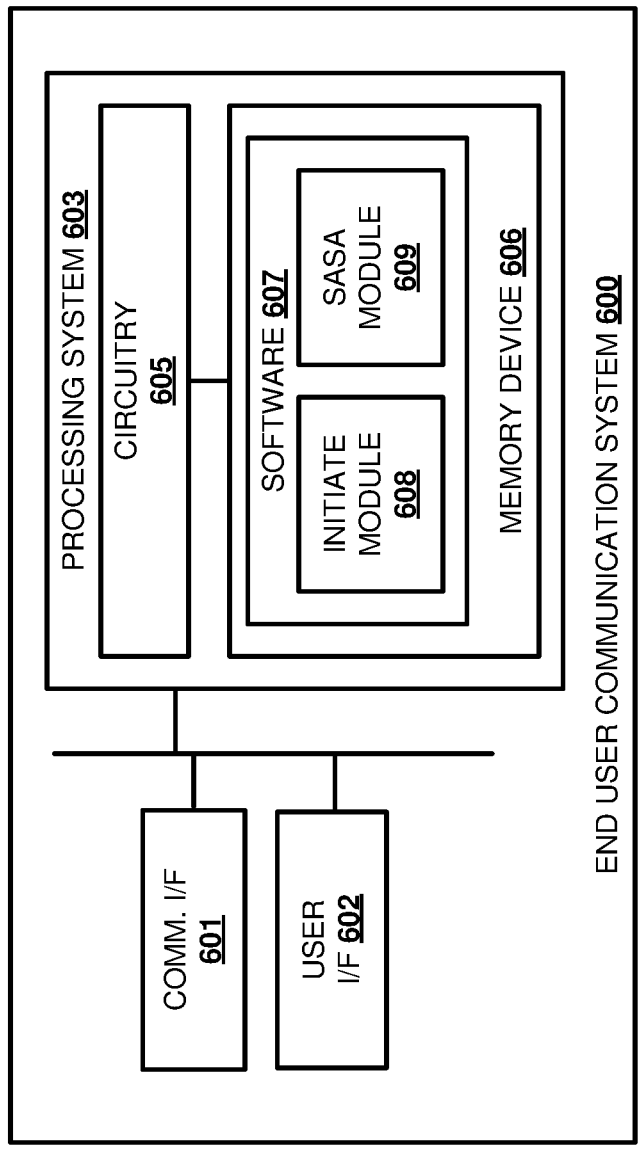
FIG. 6 illustrates an end user communication system capable of SIP communications according to one implementation.

FIG. 6 illustrates an end user communication system 600 capable of SIP communications according to one implementation. End user communication system 600 is representative of any computing system or systems with which the various operational architectures, processes, scenarios, and sequences disclosed herein for a user communication device. End user communication system 600 is an example of user devices 110-111, user devices 410-411, and user devices 510-511, although other examples may exist. End user communication system 600 comprises communication interface 601, user interface 602, and processing system 603. Processing system 603 is linked to communication interface 601 and user interface 602. Processing system 603 includes processing circuitry 605 and memory device 606 that stores operating software 607. Wireless relay computing system 600 may include other well-known components such as a battery and enclosure that are not shown for clarity.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 may be configured with multiple interfaces that permit IP communications with other communication devices using IP signaling.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes initiate module 608 and SASA module 609, although any number of software modules may provide the same operation. Operating software 607 may further include an operating system, utilities, drivers, network interfaces, applications, or some other type of software. When executed by processing circuitry 605, operating software 607 directs processing system 603 to operate end user communication system 600 as described herein.

In at least one implementation, initiate module 608, when read and executed by processing system 603, directs processing system 603 to identify a communication request for end user communication system 600 to communicate with a second communication device. This communication request may come via user interface 602, may come via an automated process executing on end user communication system 600, or may come via any similar means. In response to the communication request, SASA module 609 directs processing system 603 to identify a first source address and a second source address, wherein at least one of the first source address or the second source address is determined using a SASA operation with a SIP server for the communication.

After the determination of the source addresses, initiate module 608 directs processing system to transfer a communication request using communication interface 601 to the second communication device via the SIP server for the communication. Once the communication is transferred, initiate module 608 directs processing system 603 to receive a communication response using communication interface 601 from the second communication device, wherein the communication response indicates at least one IP address for the second communication device. Further, initiate module 608 directs processing system 603 to initiate the communication with the second communication device based on the at least one IP address for the second communication device.

In some implementations, to initiate the communication, end user communication system 600 will identify a single address provided for the second communication device. For example, communication system 600 may identify the source of the 200 OK response from the second communication device. Based on the address for the second communication device, SASA module 609 will direct processing system 603 to perform a SASA operation to determine a new source IP address for end user communication system 600. Once the new source IP address is determined, the new IP address is compared against the source IP addresses provided in the original communication request. If the new IP address matches an original source IP address that was provided in the first communication request, then the communication may be initiated using one of the original source IP addresses and the single destination address provided for the second communication device, without requiring a second communication request. In contrast, if it is determined that the new source IP address does not match one of the original source IP addresses provided in the first communication request, then initiate module 608 may direct processing system to transfer a second communication request to the second communication device, wherein the second request includes the new source IP address for end user communication system 600. Once the second request is transferred, the second communication device may respond with a 200 OK using the provided IP addresses and the communication will be initiated between the devices.

In some implementations, rather than providing a single address in the communication response, the second communication device may provide all available IP addresses for the second communication device. Based on the addresses provided in the communication response, initiate module 608 may direct processing system 603 to perform a DASA operation to determine an appropriate destination address for the second communication device. Once the destination address is determined for the second communication device, SASA module 609 directs processing system 603 to perform a SASA operation to determine a new source IP address using the identified destination address. For example, if four addresses were allocated to end user communication system 600, an address may be selected from the four addresses to support the communication with the identified destination address. After selection of the new source IP address, initiate module 608 directs processing system 603 to transfer a second communication request to the second communication device, wherein the second communication request is directed at the selected destination address for the second communication device, and wherein the request further indicates the new source IP address for end user communication system 600.

Further, in some implementations, end user communication system 600 may be configured to provide the operations of a receiving communication device. In particular, software 607 may direct processing system 603 to receive a communication request via communication interface 601, identify IP addresses associated with end user communication system 600 for the communication, and provide the IP addresses to the requesting communication device.

Returning to the elements of FIG. 1, network 130 may comprise switches, wireless access nodes, Internet routers, network gateways, application servers, computer systems, communication links, or some other type of communication equipment—including combinations thereof. This communication equipment is used to provide IP communication connectivity between user devices 110-111 and communication server SIP server 120.

User devices 110-111 may comprise any system or systems capable of communicating with one another using SIP communication signals. User systems 110-111 may each comprise a wireless phone, a computer, a tablet, a gaming system, or any other similar type of end user device. Each user system in user systems 130-135 may include communication interfaces, network interfaces, processing systems, user interfaces, computer systems, microprocessors, storage systems, storage media, or some other processing devices or software systems.

SIP server 120 comprises one or more communication interfaces, network interfaces, processing systems, computer systems, microprocessors, storage systems, storage media, or some other processing devices or software systems, and can be distributed among multiple devices. SIP server 120 may comprise one or more server computers, desktop computers, or other similar computing systems, including combinations and virtual representations thereof.

Communication links 150-152 each use metal, glass, optical, air, space, or some other material as the transport media. Communication links 150-152 may use Time Division Multiplex (TDM), asynchronous transfer mode (ATM), internet protocol (IP), Ethernet, synchronous optical networking (SONET), hybrid fiber-coax (HFC), circuit-switched, communication signaling, wireless communications, or some other communication format, including improvements thereof. Communication links 150-152 permit SIP signaling between user devices 110-111, and configuration signaling using SIP server 120. Although not illustrated in the example of FIG. 1, it should be understood that each user device of user devices 110-111 may include multiple physical links or ports that permit each of the devices to be allocated multiple IP addresses for communication.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an end user communication device, the end user communication device assigned a plurality of internet protocol (IP) addresses, the method comprising:
   in response to a request to communicate with a second communication device, identifying a first source IP address and a second source IP address from the plurality of IP addresses, wherein at least one of the first source IP address or the second source IP address is selected using a source address selection algorithm (SASA) with a destination IP address for a Session Initiation Protocol (SIP) server;
   transferring a communication request to the SIP server with the first source IP address and the second source IP address to invite a communication with the second communication device;
   receiving a communication response from the second communication device that indicates at least one IP address for the second communication device;
   applying SASA to the at least one IP address for the second communication device to determine a third source IP address for the end user communication device; and
   initiating a communication with the second communication device using the third source IP address.

2. The method of claim 1 wherein the at least one IP address for the second communication device comprises a preferred IP address for the second communication device, wherein applying SASA to the at least one IP address for the second communication device to determine the third source IP address for the end user communication device comprises applying SASA to the preferred IP address to determine the third source IP address for the user communication device, and wherein initiating the communication with the second communication device using the third source IP address comprises:
   determining whether the third source IP address matches the first source IP address or the second source IP address; and
   if the third source IP address matches the first source IP address or the second source IP address, exchanging media communications with the second communication device using the third source IP address for the end user communication device and the preferred IP address for the second communication device.

3. The method of claim 2 further comprising, if the new source IP address fails to match the first source IP address or the second source IP address, transferring a second communication request to the second communication device to initiate the communication, wherein the second communication request indicates the new third source IP address.

4. The method of claim 2 wherein the preferred IP address is determined by the second communication device by applying SASA to the first source IP address or the second source IP address from the end user communication device.

5. The method of claim 1 further comprising:
   prior to the request, identifying a registration IP address for the end user communication device to register with the SIP server, wherein the registration IP address is selected using SASA with the destination IP address for the SIP server; and
   registering the end user communication device with the SIP server using the registration IP address for the end user communication device.

6. The method of claim 1 wherein the request to communicate with the second communication device comprises a user request to initiate a voice or video communication with the second communication device.

7. The method of claim 1 wherein the communication response from the second communication device comprises a 200 OK message from the second communication device.

8. The method of claim 1 wherein the first source IP address and the second source IP address comprise an IPv4 IP address and an IPv6 IP address.

9. The method of claim 1 wherein the at least one IP address for the second communication device comprises a plurality of available IP addresses for the second communication device, wherein the method further comprises applying a destination address selection algorithm (DASA) to select a destination IP address from the plurality of available IP addresses, wherein applying SASA to the at least one IP address for the second communication device to determine the third source IP address comprises applying SASA to the destination IP address to determine the third source IP address, and wherein initiating the communication with the second communication device comprises transferring a second communication request for delivery to the second communication device with the third source IP address.

10. A computing apparatus comprising:
one or more non-transitory computer readable storage media;
a processing system operatively coupled with the one or more non-transitory computer readable storage media;
program instructions stored on the one or more non-transitory computer readable media to operate an end user communication device assigned a plurality of internet protocol (IP) addresses that, when executed by the processing system, direct the processing system to:
in response to a request to communicate with a second communication device, identify a first source IP address and a second source IP address from the plurality of IP addresses, wherein at least one of the first source IP address or the second source IP address is selected using a source address selection algorithm (SASA) with a destination IP address for a Session Initiation Protocol (SIP) server;
transfer a communication request to the SIP server with the first source IP address and the second source IP address to invite a communication with the second communication device;
receive a communication response from the second communication device that indicates at least one IP address for the second communication device;
apply SASA to the at least one IP address for the second communication device to determine a third source IP address for the end user communication device;
initiate a communication with the second communication device using the third source IP address.

11. The computing apparatus of claim 10 wherein the at least one IP address for the second communication device comprises a preferred IP address for the second communication device, wherein the program instructions to apply SASA to the at least one IP address for the second communication device to determine the third source IP address for the end user communication device direct the processing system to apply SASA to the preferred IP address to determine the third source IP address for the user communication device, and wherein the program instructions to initiate the communication with the second communication device using the third source IP address direct the processing system to:
determine whether the third source IP address matches the first source IP address or the second source IP address; and
if the third source IP address matches the first source IP address or the second source IP address, exchange media communications with the second communication device using the third source IP address for the end user communication device and the preferred IP address for the second communication device.

12. The computing apparatus of claim 11 wherein the program instructions further direct the processing system to, if the new source IP address fails to match the first source IP address or the second source IP address, transfer a second communication request to the second communication device to initiate the communication, wherein the second communication request indicates the third source IP address.

13. The computing apparatus of claim 11 wherein the preferred IP address is determined by the second communication device by applying SASA to the first source IP address or the second source IP address from the end user communication device.

14. The computing apparatus of claim 10 wherein the program instructions further direct the processing system to:
prior to the request, identify a registration IP address for the end user communication device to register with the SIP server, wherein the registration IP address is selected using SASA with the destination IP address for the SIP server; and
register the end user communication device with the SIP server using the registration IP address for the end user communication device.

15. The computing apparatus of claim 10 wherein the request to communicate with the second communication device comprises a user request to initiate a voice or video communication with the second communication device.

16. The computing apparatus of claim 10 wherein the communication response from the second communication device comprises a 200 OK message from the second communication device.

17. The computing apparatus of claim 10 wherein the first source IP address and the second source IP address comprise an IPv4 IP address and an IPv6 IP address.

18. The computing apparatus of claim 10 wherein the at least one IP address for the second communication device comprises a plurality of available IP addresses for the second communication device, wherein the program instructions further direct the processing system to apply a destination address selection algorithm (DASA) to select a destination IP address from the plurality of available IP addresses, wherein the program instructions to apply SASA to the at least one IP address for the second communication device to determine the third source IP address direct the processing system to apply SASA to the destination IP address to determine the third source IP address, and wherein the program instructions to initiate the communication with the second communication device using the third source IP address direct the processing system to transfer a second communication request for delivery to the second communication device with the third source IP address to initiate the communication with the second communication device.

19. A communication system comprising:
a first communication device allocated a plurality of internet protocol (IP) addresses and configured to, in response to a request to communicate with a second communication device, identify a first source IP address and a second source IP address from the plurality of IP addresses, wherein at least one of the first source IP address or the second source IP address is selected using a source address selection algorithm (SASA) with a destination IP address for a Session Initiation Protocol (SIP) server, and transfer a communication request to the SIP server with the first source IP address and the second source IP address to invite a communication with the second communication device;
the second communication device configured to identify at least one IP address for the second communication device and transfer a communication response to the first communication device that indicates the at least one IP address;
the first communication device configured to receive the communication response, apply SASA to the at least one IP address for the second communication device to determine a third source IP address for the first communication device, and initiate a communication with the second communication device using the third source IP address.

20. The communication system of claim 19 wherein the at least one IP address for the second communication device comprises a plurality of available IP addresses for the second communication device, wherein the first communication device is further configured to apply a destination address selection algorithm (DASA) to select a destination IP address from the plurality of available IP addresses, wherein the first communication device configured to apply SASA to the at least one IP address for the second communication device to determine the third source IP address is configured to apply SASA to the destination IP address to determine the third source IP address, and wherein the first communication device configured to initiate the communication with the second communication device using the third source IP address is configured to transfer a second communication request for delivery to the second communication device with the third source IP address to initiate the communication with the second communication device.

\* \* \* \* \*